US007604099B2

(12) United States Patent
Kigawa et al.

(10) Patent No.: US 7,604,099 B2
(45) Date of Patent: Oct. 20, 2009

(54) BRAKE DEVICE FOR ELEVATOR

(75) Inventors: Hiroshi Kigawa, Tokyo (JP); Takaharu Ueda, Tokyo (JP); Kenichi Okamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 372 days.

(21) Appl. No.: 10/589,582

(22) PCT Filed: Mar. 9, 2005

(86) PCT No.: PCT/JP2005/004073

§ 371 (c)(1),
(2), (4) Date: Aug. 16, 2006

(87) PCT Pub. No.: WO2005/087643

PCT Pub. Date: Sep. 22, 2005

(65) Prior Publication Data

US 2007/0272503 A1 Nov. 29, 2007

(30) Foreign Application Priority Data

Mar. 15, 2004 (JP) ............................ 2004-073306

(51) Int. Cl.
*B60T 13/04* (2006.01)
*B66B 1/32* (2006.01)

(52) U.S. Cl. ........................ 188/171; 188/28; 188/72.6; 188/161; 187/288

(58) Field of Classification Search .................. 188/28, 188/56, 72.6, 156, 158, 161, 164, 171, 166, 188/167, 168; 187/288, 366, 370, 375; 192/66.22, 192/66.23, 66.31, 66.32, 89.22, 89.23, 89.24, 192/89.25
See application file for complete search history.

(56) References Cited

U.S. PATENT DOCUMENTS

| | | | | | |
|---|---|---|---|---|---|
| 802,074 | A | * | 10/1905 | Dillon ........................ | 188/171 |
| 2,663,387 | A | * | 12/1953 | Berkovitz .................. | 188/171 |
| 3,028,934 | A | * | 4/1962 | Lister ......................... | 188/171 |
| 3,795,290 | A | * | 3/1974 | Hori et al. .................. | 188/171 |
| 3,830,344 | A | * | 8/1974 | Cervenec et al. ........... | 188/171 |

(Continued)

FOREIGN PATENT DOCUMENTS

DE 39 34 492 A1 4/1990

(Continued)

*Primary Examiner*—Thomas J Williams
(74) *Attorney, Agent, or Firm*—Oblon, Spivak, McClelland, Maier & Neustadt, L.L.P.

(57) ABSTRACT

Provided is a braking device for an elevator in which energy required for braking and releasing is reduced. The braking device includes a movable plunger (5), braking mechanisms (1-4, 6, 7) which are connected to one end of the movable plunger and are switched between a braking state and a releasing state by an axial movement of the movable plunger, a first drive mechanism (10) using mechanical or magnetic force, for reversing the movable plunger in the middle of a movable range in an axial direction for the switching between the braking state and the releasing state to press and hold the movable plunger to the braking side or the releasing side, and a second drive mechanism (20) using an electromagnetic force, for driving the movable plunger to a reversion position in the middle of the movable range from the braking side or the releasing side against a pressing force of the first drive mechanism in order to switch between the braking state and the release state.

16 Claims, 12 Drawing Sheets

U.S. PATENT DOCUMENTS 5,739,610 A * 4/1998 Nemoto et al. .............. 188/161
5,945,644 A * 8/1999 Jang ........................... 187/296
6,318,505 B1 * 11/2001 De Angelis ................. 187/292

FOREIGN PATENT DOCUMENTS

EP 0 346 195 A1 12/1989
JP 57 000128 1/1982
JP 29754 1983 2/1983
JP 59 067631 5/1984
JP 60179535 A * 9/1985
JP 5 124777 5/1993
JP 9 326222 12/1997
JP 2001 19292 1/2001
JP 2002 343199 11/2002

* cited by examiner

BRAKE DEVICE FOR ELEVATOR

TECHNICAL FIELD

The present invention relates to a braking device for an elevator.

BACKGROUND ART

Conventionally, there has been a braking device for an elevator, which keeps a braking state with a pressing force of a spring, and keeps a releasing state with a magnetic force of a permanent magnet. The braking state is switched to the releasing state by energizing an electromagnet coil with a DC current to generate a strong magnetic field in the same direction as that of the permanent magnet, thereby attracting an armature against the force of the spring. After the attraction is completed, the armature can be kept in an attracted state owing to a magnetic force of the permanent magnet even if the DC current is interrupted. The releasing state is switched to the braking state by energizing the coil with a DC current generating a magnetic force that cancels the magnetic force of the permanent magnet (see Patent Document 1, for example).

Patent Document 1: Japanese Utility Model Application Laid-open No. Sho 57-128

DISCLOSURE OF THE INVENTION

Problem to be Solved by the Invention

In the conventional braking device for an elevator as described above, it is required to compress the spring with a force even larger than a force corresponding to a braking force, for switching between the braking state to the releasing state. Therefore, a current that flows through the coil cannot help increasing.

An object of the present invention is to provide a braking device for an elevator with smaller energy required for braking and releasing a brake.

Means for Solving the Problem

The present invention provides a braking device for an elevator, characterized by including: a movable plunger; a braking mechanism that is connected to one end of the movable plunger and is switched between a braking state and a releasing state due to a movement in an axial direction of the movable plunger; a first drive mechanism using a mechanical or magnetic force, for reversing the movable plunger in a middle of a movable range in the axial direction for switching between the braking state and the releasing state to press and hold the movable plunger to a braking side or a releasing side; and a second drive mechanism using an electromagnetic force, driving the movable plunger to a reversion position in the middle of the movable range from the braking side or the releasing side against a pressing force of the first drive mechanism in order to switch between the braking state and the release state.

Effect of the Invention

According to the present invention, a braking device for an elevator with smaller energy required for braking and releasing a brake of an elevator can be provided.

BEST MODE FOR CARRYING OUT THE INVENTION

According to the present invention, a switching between a braking state and a releasing state of a braking device is performed by reversion of a belleville spring, and reversion of a magnetic circuit using a magnet and a movable iron core, and both the states are kept by the same mechanism. Furthermore, a switching device for switching between the braking state and the releasing state of the braking device is composed of a non-magnetic repulsion plate and two coils placed on both sides so as to be opposed to each other, and utilizes a repulsion force obtained owing to an eddy current which is generated in the repulsion plate when a pulse current flows through one of the coils. Furthermore, the switching device for switching between the braking state and the releasing state of the braking device is composed of a movable iron core and two coils placed on both sides so as to be opposed to each other, and a yoke constituting a magnetic path, and utilizes an attraction force with respect to the movable iron core generated when one of the coils is excited by causing a current to flow therethrough.

Consequently, in the conventional braking device, it is necessary to attract an armature against a spring force generating a braking force in shifting the braking state to the releasing state. Therefore, a large force is required over an entire travel stroke of the armature, making it necessary to use large energy. According to the braking device of the present invention, the switching between the releasing state and the braking state of the braking device is performed with the reversion of the same mechanism. Therefore, in order to switch a state, only energy for reversing the mechanism (i.e. about half of the stroke) is required, whereby small energy suffices. Furthermore, the braking device of the present invention is characterized in that the braking device can follow an operation even if the operation speed of the braking device during braking is increased, and a grasp position is shifted from the center. Hereinafter, the present invention will be described in accordance with each embodiment.

EMBODIMENT 1

Figure 1:
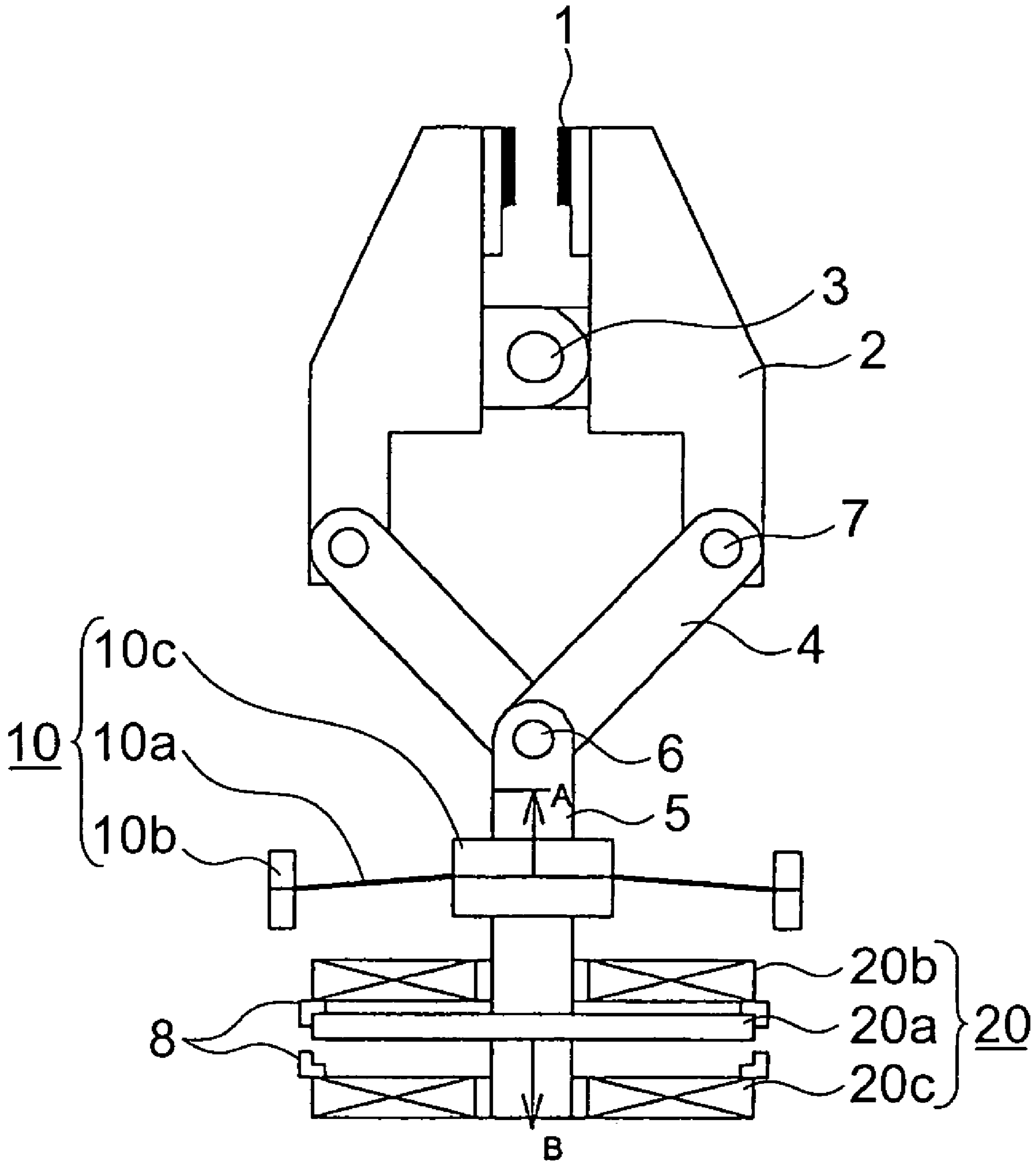
FIG. 1 A view showing a configuration of a braking device for an elevator according to Embodiment 1 of the present invention.

FIG. 1 shows a configuration of a braking device for an elevator according to Embodiment 1 of the present invention. An outer edge of a belleville spring 10*a* is supported on a fixing portion by a support portion 10*b*. Furthermore, an inner edge (center portion) of the belleville spring is fixed onto a movable plunger 5 by a support portion 10*c*. One end of the movable plunger 5 is connected to one end of a link 4 via a support shaft 6, and the link 4 can rotate about the support shaft 6. The other end of the link 4 is connected to an end of an arm 2 via the support shaft 7 so as to be rotatable with respect to a support shaft 7. The arm 2 is rotatably fixed to a fixing shaft 3. At a tip end of the arm 2, a sliding member 1 that comes into direct contact with a disk, a rail (not shown), or the like is mounted. At the other end of the movable plunger 5, a drive portion 20 of the movable plunger is placed. The drive portion 20 is composed of a repulsion plate 20*a* made of a non-magnetic material such as aluminum or copper, a releasing coil 20*b* placed so as to be opposed to the repulsion plate 20*a*, and a braking coil 20*c*. The repulsion plate 20*a* is fixed to the movable plunger 5, and the releasing coil 20*b* and the braking coil 20*c* are placed on opposite sides (so as to be opposed) to each other with the repulsion plate 20*a* interposed therebetween. Note that, a braking mechanism is constituted of members denoted by reference numerals 1 to 4, 6, and 7, a first drive mechanism is constituted of members denoted by reference numerals 10*a*-10*c*, and a second drive mechanism is constituted of members denoted by reference numeral 20.

Next, an operation will be described. FIG. 1 shows a state in which a disk or a rail is held between the sliding members 1, and a braking force is exhibited. At this time, the belleville spring 10*a* generates a spring force in a direction represented by an arrow A with respect to the support portion 10*c*. As a result, the movable plunger 5 also receives a force in the direction represented by the arrow A, and the support shafts 7 of the links 4 attempt to open toward right and left sides. The arms 2 generate a force in a direction of closing the sliding members 1 with the fixing shaft 3 being a pivot, whereby a sufficient braking force can be obtained.

Figure 2:
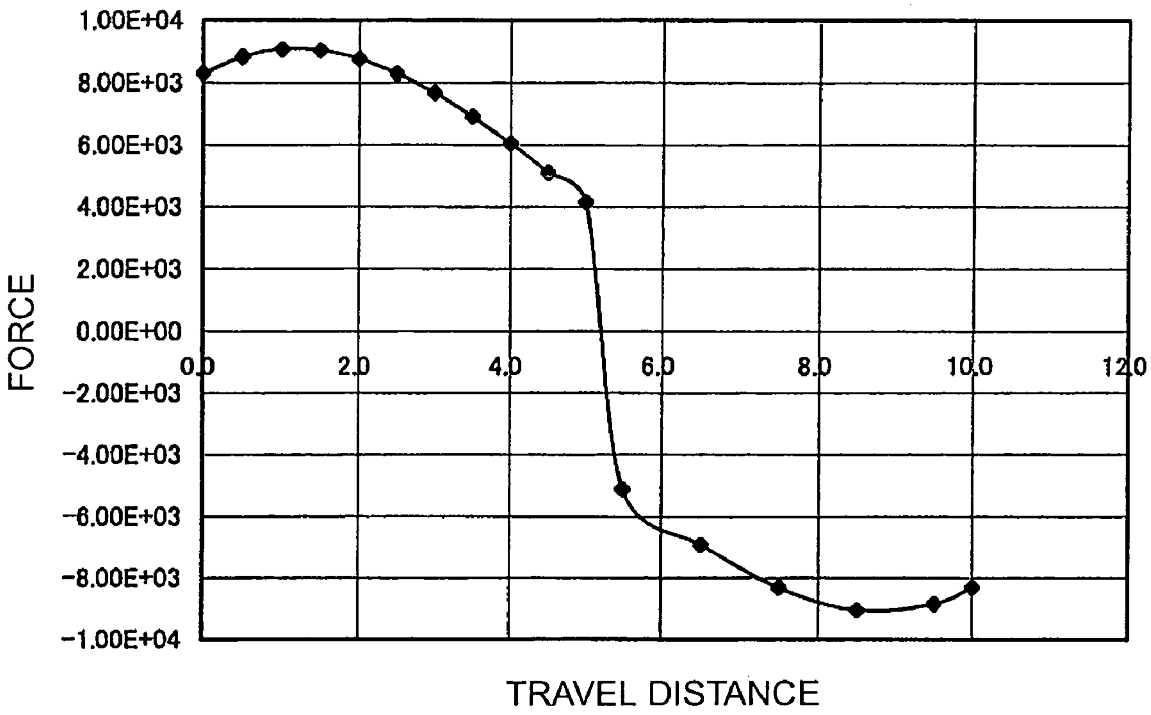
FIG. 2 A diagram schematically showing a relationship between a travel distance of a movable plunger and a force in a direction represented by an arrow A of a belleville spring in the braking device of FIG. 1.
Figure 3:
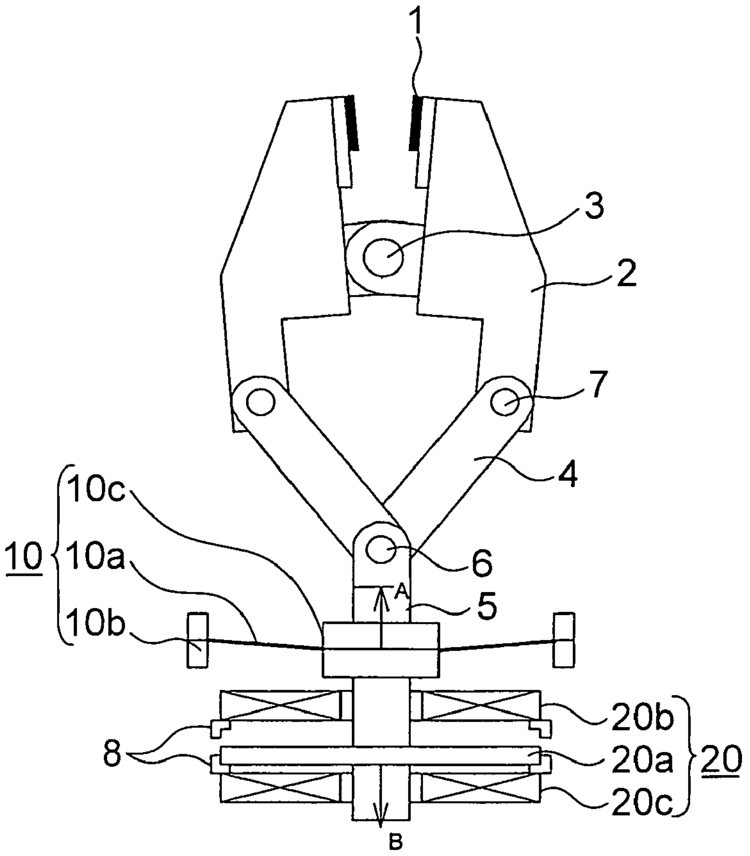
FIG. 3 A view showing a releasing state of the braking device of FIG. 1.

When a large current is allowed to flow momentarily through the releasing coil 20*b* from the state of FIG. 1, an eddy current is generated in the repulsion plate 20*a* so as to cancel a magnetic field generated in a coil. The magnetic field of the releasing coil 20*b* and the magnetic field generated by the eddy current in the repulsion plate 20*a* repel each other, whereby the repulsion plate 20*a* receives a force in a direction represented by an arrow B. The force received by the repulsion plate 20*a* is larger than the force generated by the belleville spring 10*a*, and the movable plunger 5 starts moving in the direction represented by the arrow B. FIG. 2 schematically shows a travel distance of the movable plunger 5 at this time and the force generated by the belleville spring 10*a* in the direction represented by the arrow A. A horizontal axis of FIG. 2 represents an entire travel distance 10. When the movable plunger 5 travels to a predetermined position (position where the belleville spring becomes flat), the belleville spring is reversed, and the support portion 10*c* travels to an arrow B side beyond the support portion 10*b*. The belleville spring 10*a* starts generating a negative force (i.e., a force in the direction represented by the arrow B) with respect to the direction represented by the arrow A (actually, a force in an opposite direction is generated beyond a neutral position). Consequently, even if a current is not flowing through the releasing coil 20*b*, as shown in FIG. 3, the movable plunger 5 travels in the direction represented by the arrow B with the force of the belleville spring 10*a*, the support shafts 7 travel so as to close from the right and left sides due to the function of the links 4, the arms 2 rotate in a direction of opening the sliding members 1 with the fixing shaft 3 being the pivot, the braking force is released, and the releasing state is kept by the spring force of the belleville spring 10*a*. At this time, although the movable range of the movable plunger 5 is determined by the spring force of the belleville spring 10*a*, it is preferable to provide a stopper 8 limiting the movable range at the fixing portion 10*c* or the repulsion plate 20*a* so as to prevent a collision between the coils 20*b*, 20*c* and the repulsion plate 20*a*.

The releasing state may be switched to the braking state by causing a large current to momentarily flow through the braking coil 20*c*. The operation principle is the same as that of the switching from the braking state to the releasing state except that the direction of a force to be generated becomes opposite. Therefore, the detailed description thereof will be omitted.

Figure 4:
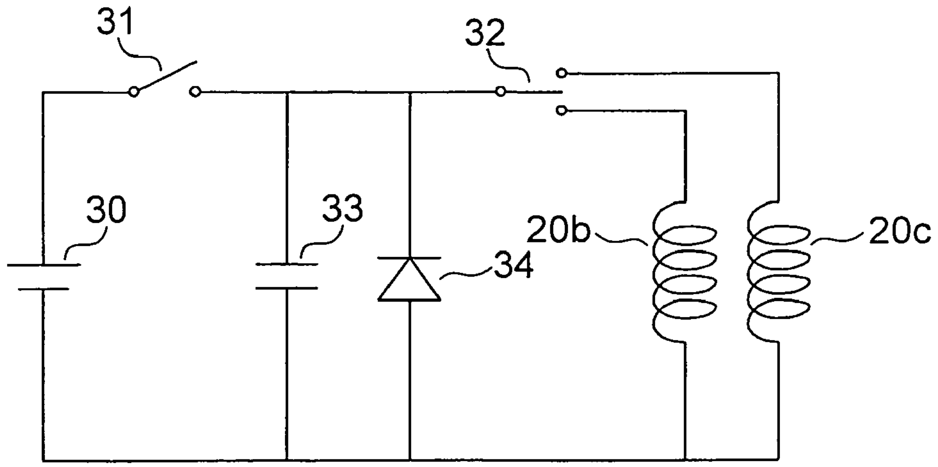
FIG. 4 A diagram showing exemplary power supplies for a releasing coil and a braking coil of the braking device for an elevator according to the present invention.

A power supply apparatus for causing the above-mentioned large current to momentarily flow through the coils 20*b* and 20*c* can be obtained by closing a switch 31 and opening a switch 32 to discharge a charge, which is previously charged in a capacitor 33 from a DC power supply 30 by opening the switch 31 and the closing the switch 32, as shown in FIG. 4. At this time, a diode 34 protects the capacitor 33 from a reverse flow of the current, and concurrently, prevents the fluctuation in electromagnetic characteristics to enhance energy efficiency. Furthermore, the switching between the braking state and the releasing state is performed by connecting the switch 32 to the releasing coil 20*b* or by connecting to the braking coil 20*c*. According to this system, the switching between the braking state and the releasing state can be performed while the capacitor is charged even in the event of a power failure, and a safety as an emergency braking device can be ensured. A switching power supply at this time supplies electric power by an emergency battery (not shown) for operating the elevator to a nearest floor in the event of a power failure, which is originally provided in the elevator. The electric power required for switching is very weak, so the electric power required for operating the elevator to the nearest floor in the event of a power failure is not influenced even if the battery is not enforced for switching. Furthermore, it is also possible to increase the capacity of the emergency battery to charge the capacitor.

With the construction described above, according to the present system, the brake releasing state and braking state are both caused by the reversion of the belleville spring, so energy required for switching the state is that of merely reversing the mechanism, that is, about half of a stroke), whereby small energy suffices, while the conventional brake needs large energy because of a need for attracting an armature against a spring force generating a braking force in shifting the braking state to the releasing state. Furthermore, the repulsion force in a magnetic field caused by an eddy current is used as a drive force for switching between the braking state and the releasing state of the brake, so the brake operation is fast.

EMBODIMENT 2

Figure 5:
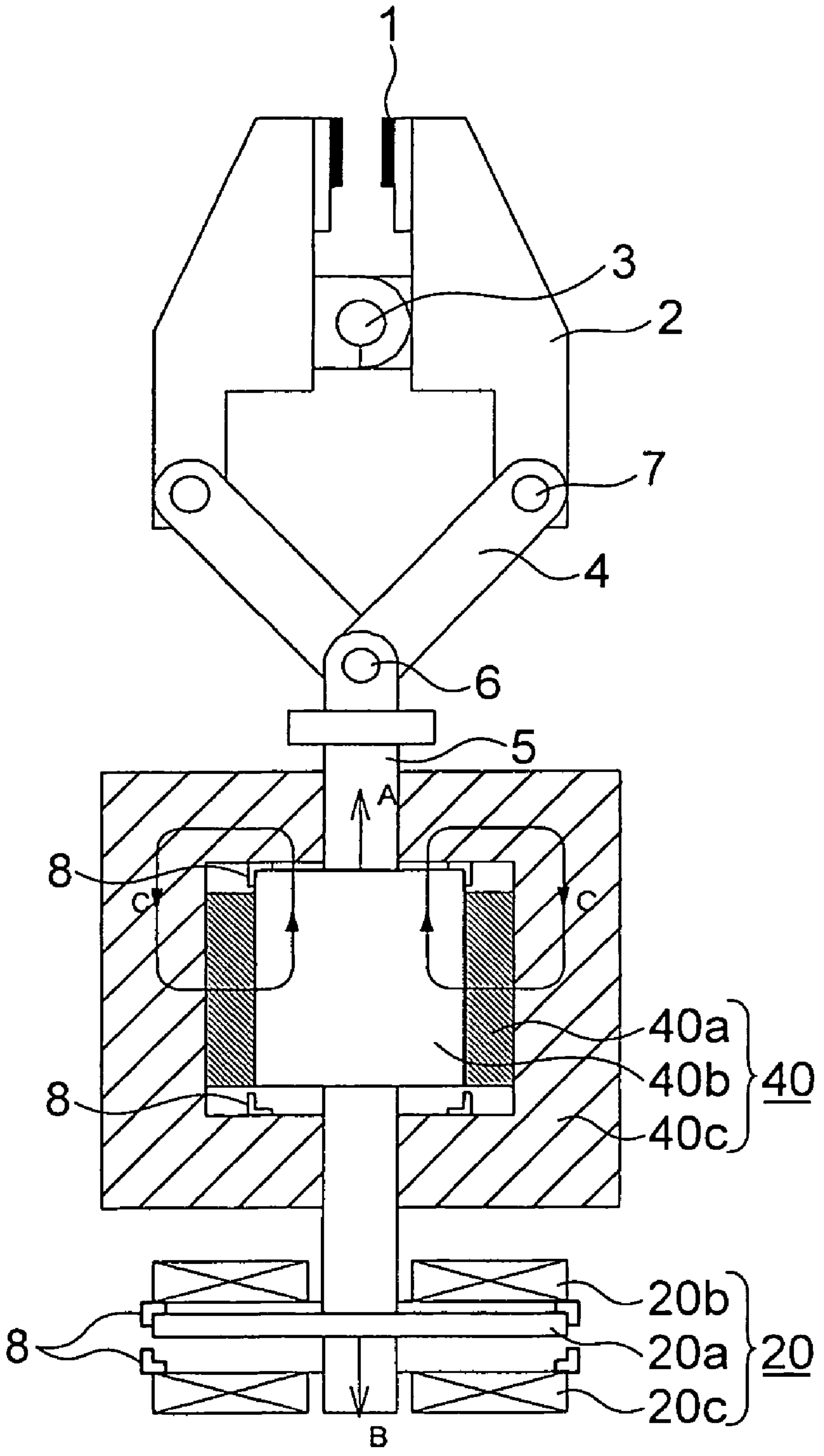
FIG. 5 A view showing a configuration of a braking device for an elevator according to Embodiment 2 of the present invention.

FIG. 5 shows a configuration of a braking device for an elevator according to Embodiment 2 of the present invention. A magnet spring 40 is composed of a permanent magnet 40*a*, a movable iron core 40*b* that is fixed to the movable plunger 5 and moves integrally therewith, and a yoke 40*c* placed so as to surround them. The other configuration is the same as that of Embodiment 1. Note that, a braking mechanism is constituted of members denoted by reference numerals 1 to 4, 6, and 7, a first drive mechanism is constituted of members denoted by reference numeral 40, and a second drive mechanism is constituted of members denoted by reference numeral 20.

Next, an operation will be described. FIG. 5 shows a state in which a disk or a rail is held between the sliding members 1, and a braking force is exhibited. At this time, the movable iron core 40*b* is pressed in a direction represented by an arrow A due to a magnetic flux generated by the permanent magnet 40*a* in a direction represented by an arrow C. As a result, the movable plunger 5 also receives a force in the direction represented by the arrow A, and the support shafts 7 of the links 4 attempt to open toward the right and left sides. The arms 2 generate a force in a direction of closing the sliding members 1 with the fixing shaft 3 being a pivot, whereby a sufficient braking force can be obtained.

Figure 6:
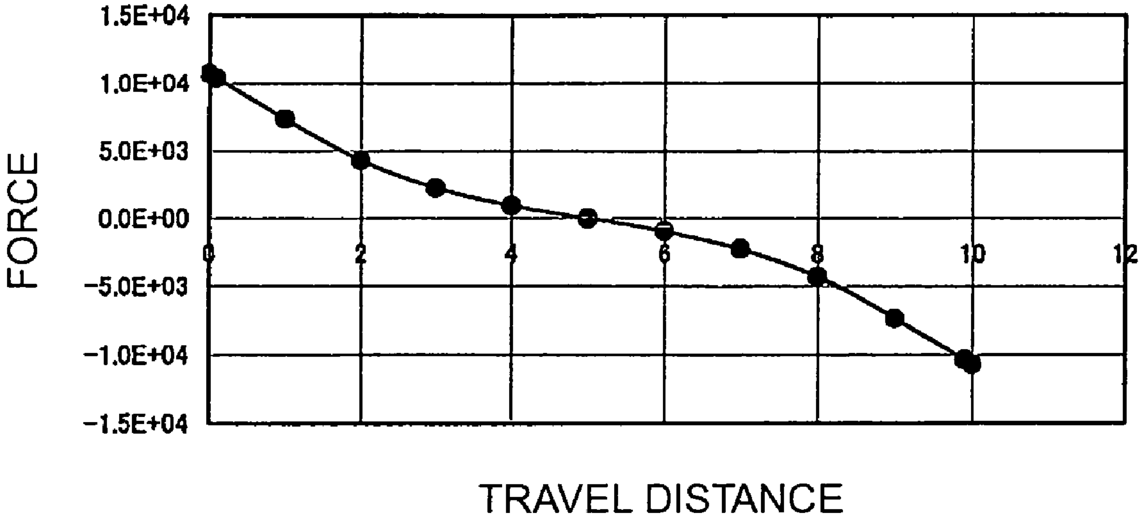
FIG. 6 A diagram schematically showing a relationship between a travel distance of a movable plunger and a magnetic force in a direction represented by an arrow A of a permanent magnet in the braking device of FIG. 5.
Figure 7:
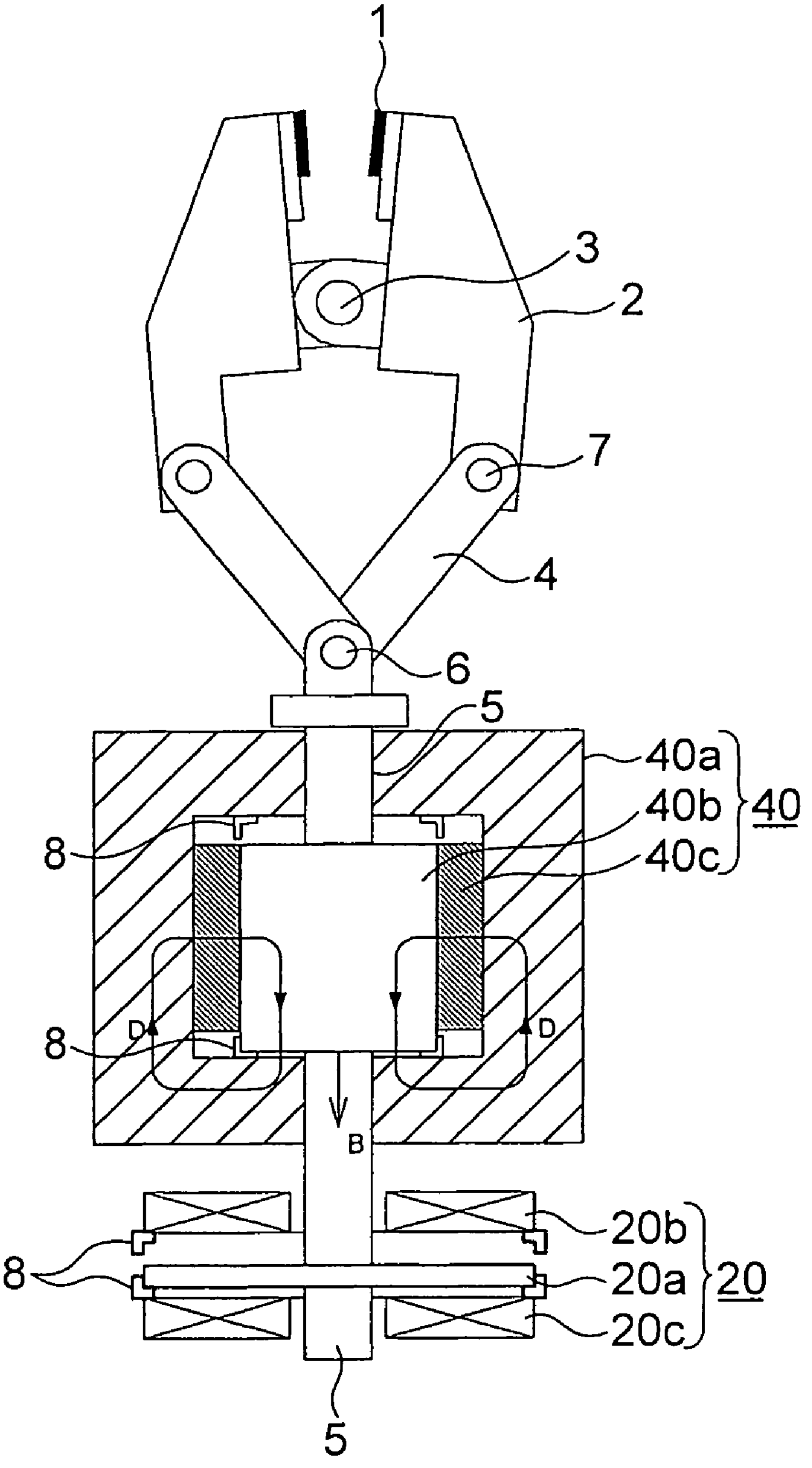
FIG. 7 A view showing a releasing state of the braking device of FIG. 5.

When a large current is allowed to flow momentarily through the releasing coil 20*b* from the state of FIG. 5, an eddy current is generated in the repulsion plate 20*a* so as to cancel the magnetic field generated in the coil. The magnetic field of the releasing coil 20*b* and the magnetic field generated by the eddy current in the repulsion plate 20*a* repel each other, whereby the repulsion plate 20*a* receives a force in a direction represented by an arrow B. The force received by the repulsion plate is larger than the magnetic force generated by the permanent magnet 40*a*, and the movable plunger 5 starts moving in the direction represented by the arrow B. FIG. 6 schematically shows a travel distance of the movable plunger 5 at this time and the magnetic force generated by the permanent magnet in the direction represented by the arrow A. A horizontal axis of FIG. 6 shows an entire travel distance 10. When the movable plunger 5 travels to a predetermined position (intermediate position of a stroke), the magnetic field in a direction represented by an arrow C of FIG. 5 and the magnetic field in a direction represented by an arrow D shown in FIG. 7 are balanced, and the movable iron core 40*b* travels with inertia without being influenced by a force. When the movable plunger 5 travels further, a magnetic path is formed in the direction represented by the arrow D as shown in FIG. 7, and a negative force (i.e., a force in the direction represented by the arrow B) starts to be generated in the direction represented by the arrow A. Therefore, even if a current is not allowed to flow through the releasing coil, as shown in FIG. 7, the movable plunger 5 travels with the magnetic force in the direction represented by the arrow B, the support shafts 7 travel so as to close from the right and left sides due to the function of the links 4, the arms 2 rotate in the direction of opening the sliding members 1 with the fixing shaft 3 being the pivot, the braking force is released, and the releasing state is kept with the magnetic force. At this time, it is preferable to provide the stopper 8 limiting a movable range at upper and lower limits of the movable range of the movable iron core 40*b* or the repulsion plate 20*a* so as to prevent the contact between the movable iron core 40*b* and the yoke 40*c*, and the contact between the coils 20*b*, 20*c* and the repulsion plate 20*a*.

The releasing state may be switched to the braking state by causing a large current to momentarily flow through the braking coil 20*c*. The operation principle is the same as that of the switching from the braking state to the releasing state except that the direction of a force to be generated becomes opposite. Therefore, the detailed description thereof will be omitted.

With the construction described above, according to the present system, the brake releasing state and braking state are both caused by the reversion of the magnetic field generated by the movement of the iron core, so energy required for switching the state is that of merely reversing the magnetic field, whereby small energy suffices, while the conventional brake needs large energy because of a need for attracting an armature against a spring force generating a braking force in shifting the braking state to the releasing state. Furthermore, the repulsion force in a magnetic field caused by an eddy current is used as a drive force for switching between the braking state and the releasing state of the brake, so the brake operation is fast.

EMBODIMENT 3

Figure 8:
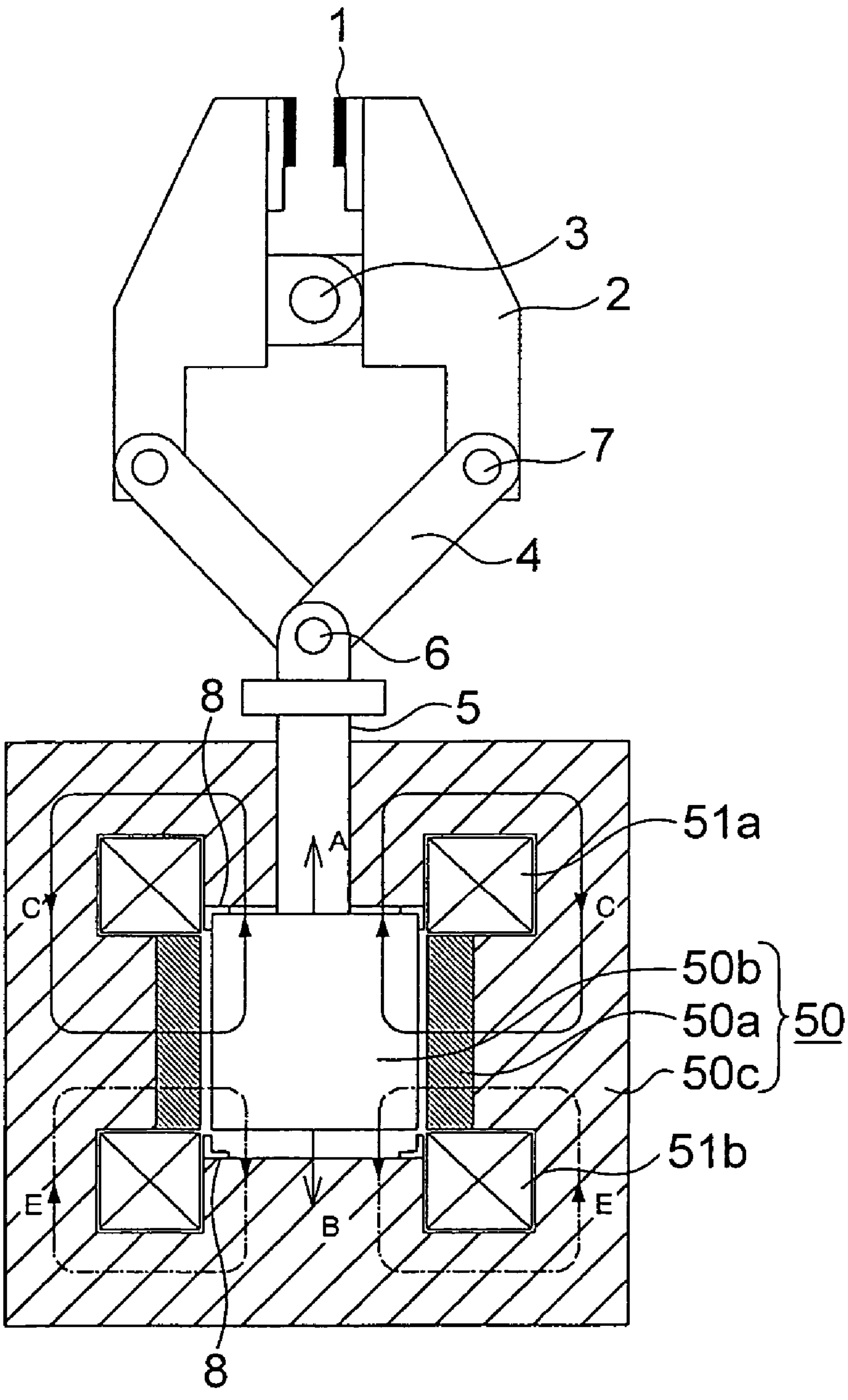
FIG. 8 A view showing a configuration of a braking device for an elevator according to Embodiment 3 of the present invention.

FIG. 8 shows a configuration of a braking device for an elevator according to Embodiment 3 of the present invention. An electromagnetic attracting device 50 is composed of a permanent magnet 50*a*, a movable iron core 50*b* that is fixed to the movable plunger 5 and travels integrally therewith, a braking coil 51*a* and a releasing coil 51*b* placed on opposite sides (so as to be opposed) on both sides of the permanent magnet 50*a*, and a yoke 50*c* placed so as to surround coils 51*a*, 51*b*, the permanent magnet 50*a*, and the movable iron core 50*b*. The other configuration is the same as that of Embodiment 1. Note that, a braking mechanism is constituted of members denoted by reference numerals 1 to 4, 6, and 7, a first drive mechanism is constituted of members denoted by reference numeral 50, and a second drive mechanism is constituted of members denoted by reference numerals 51*a* and 51*b*.

Next, an operation will be described. FIG. 8 shows a state in which a disk or a rail is held between the sliding members 1, and a braking force is exhibited. At this time, both the braking coil 51*a* and the releasing coil 51*b* are not excited, and the movable iron core 50*b* is pressed in the direction represented by the arrow A due to a magnetic flux generated by the permanent magnet 50*a* in the direction represented by the arrow C. As a result, the movable plunger 5 also receives the force in the direction represented by the arrow A, and the support shaft 7 of the link 4 attempts to open toward right and left sides. The arm 2 generates a force in the direction of closing the sliding member 1 with the fixing shaft 3 being a pivot, whereby a sufficient braking force can be obtained.

Figure 9:
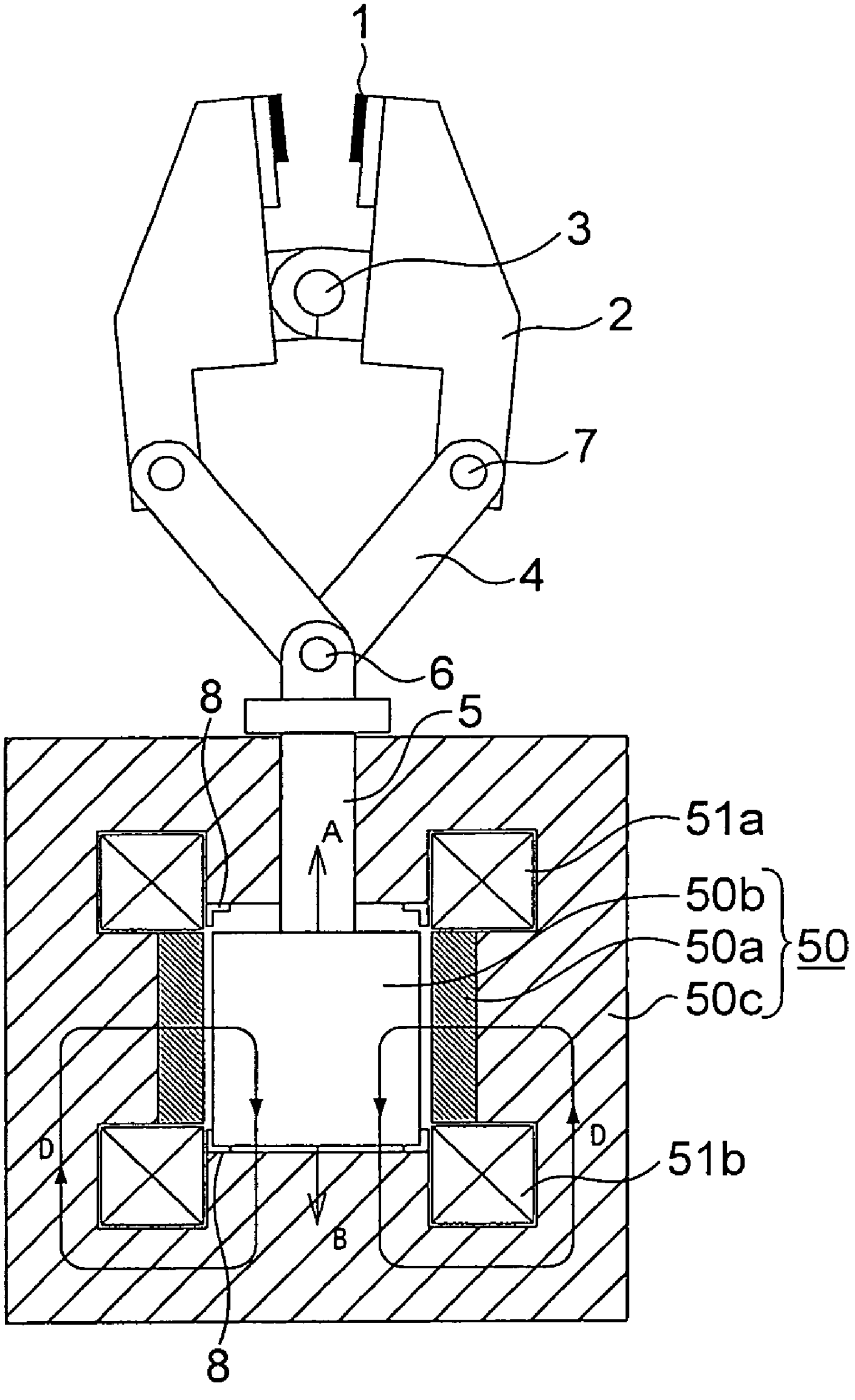
FIG. 9 A view showing a releasing state of the braking device of FIG. 8.

When the releasing coil 51*b* is excited by causing a current to flow therethrough from the state of FIG. 8, a magnetic flux in a direction represented by an arrow E is formed to generate a force of pulling the movable iron core 50*b* back to the direction represented by the arrow B. If the current flowing through the coil is set to be sufficiently strong, the magnetic field generated by the coil becomes larger than the magnetic field generated by the permanent magnet, and the movable iron core 50*b* starts traveling in the direction represented by the arrow B. When the movable plunger travels to a predetermined position (intermediate position of a stroke), the movable iron core 50*b* travels with inertia without being influenced by a magnetic force. When the movable plunger 5 travels further, the magnetic field generated by the permanent magnet in the direction represented by the arrow C of FIG. 8 and the magnetic field generated by the permanent magnet in a direction represented by an arrow D show in FIG. 9 are balanced, and the movable iron core 50*b* travels with inertia without being influenced by a force from the permanent magnet 50*a*. A magnetic path is formed in the direction represented by the arrow D as shown in FIG. 9, and a negative force (i.e., a force in the direction represented by the arrow B) starts to be generated with respect to the arrow A. Therefore, even if a current is not caused to flow through the releasing coil 51*b*, as shown in FIG. 9, the movable plunger 5 travels in the direction represented by the arrow B with the magnetic force generated by the permanent magnet 50*a*, the support shafts 7 travel so as to close from the right and left sides due to the function of the links 4, the arms 2 rotate in the direction of opening the sliding members 1 with the fixing shaft 3 being a pivot, the braking force is released, and the releasing state is kept with the magnetic force. At this time, it is preferable to provide the stopper 8 for limiting a movable range of the movable iron core 50*b* at upper and lower limits of the movable range so as to prevent the contact between the movable iron core 50*b* and the yoke 50*c*.

The releasing state may be switched to the braking state by causing a current to flow through the braking coil 51*a* to exciting the braking coil 51*a*. The operation principle is the same as that of the switching from the braking state to the releasing state except that the direction of a force to be generated becomes opposite. Therefore, the detailed description thereof will be omitted.

With the construction described above, according to the present system, the brake releasing state and braking state are both caused by the reversion of the magnetic field generated by the movement of the iron core, so energy required for switching the state is that of merely reversing the mechanism, whereby small energy suffices, while the conventional brake needs large energy because of a need for attracting an armature against a spring force generating a braking force in shifting the braking state to the releasing state. Furthermore, the repulsion force in a magnetic field caused by an eddy current is used as a drive force for switching between the braking state and the releasing state of the brake, so the brake operation is fast.

EMBODIMENT 4

Figure 10:
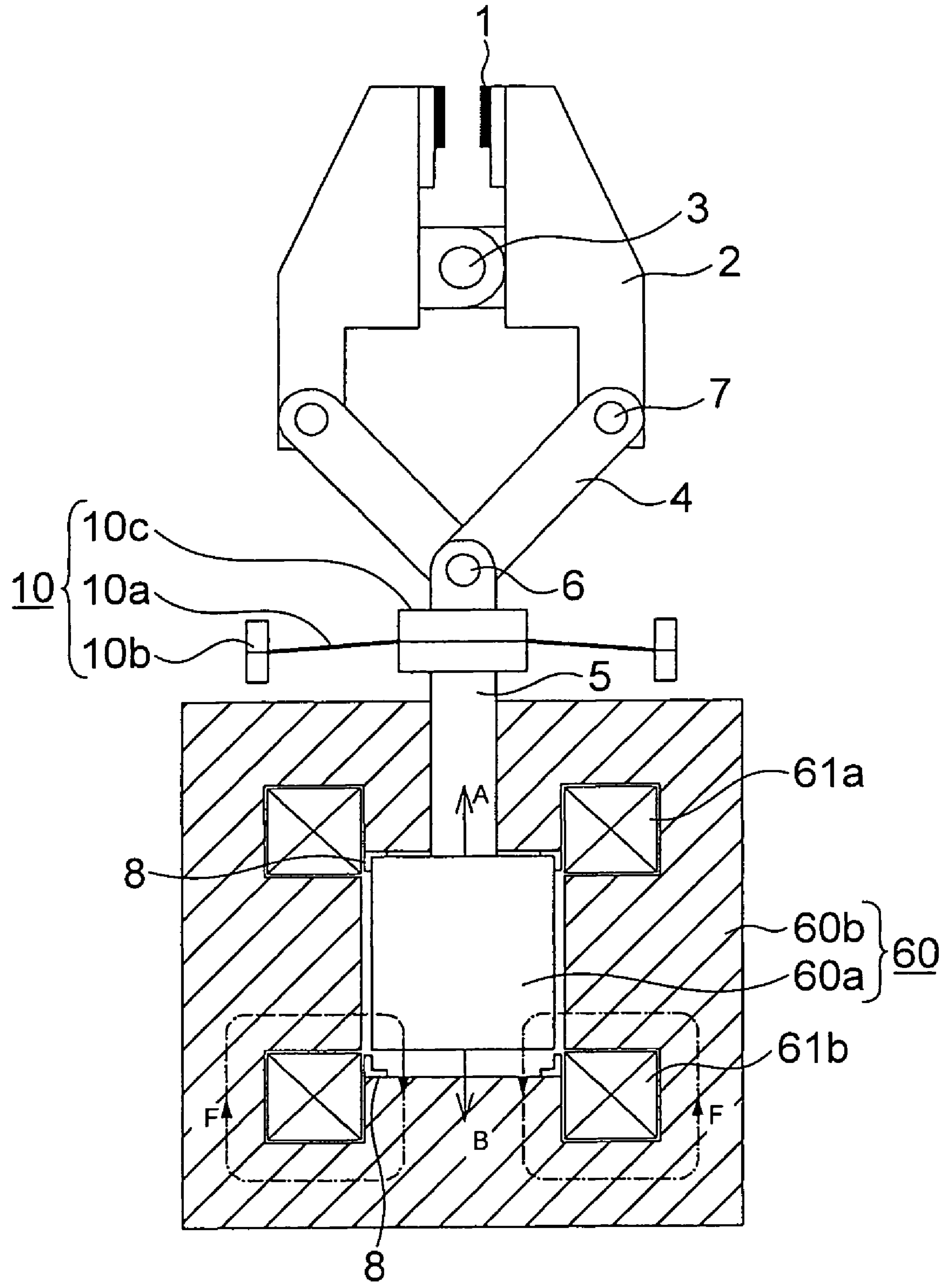
FIG. 10 A view showing a configuration of a braking device for an elevator according to Embodiment 4 of the present invention.

FIG. 10 shows a configuration of a braking device for an elevator according to Embodiment 4 of the present invention. An electromagnetic attracting device 60 is composed of a movable iron core 60*a* that is fixed to the movable plunger 5 and moves integrally therewith, a braking coil 61*a* and a releasing coil 61*b* placed so as to be opposed to each other with the movable iron core 60*a* interposed therebetween, and a yoke 60*b* placed so as to form a magnetic path surrounding the coils 61*a*, 61*b*, and the movable iron core 60*a*. The other configuration is the same as that of Embodiment 1. Note that, a braking mechanism is constituted of members denoted by reference numerals 1 to 4, 6, and 7, a first drive mechanism is constituted of members denoted by reference numerals 10*a*-10*c*, and a second drive mechanism is constituted of members denoted by reference numerals 60, 61*a*, and 61*b*.

Next, an operation will be described. FIG. 10 shows a state in which a disk or a rail are held between the sliding members 1, and a braking force is exhibited. At this time, the braking coil 61*a* and the releasing coil 61*b* both are not excited, and the movable iron core 60*a* is pressed in the direction represented by the arrow A due to a repulsion force of the belleville spring 10*a*. As a result, the movable plunger 5 also receives the force in the direction represented by the arrow A, and the support shafts 7 of the links 4 attempt to open toward the right and left sides. The arms 2 generate a force in the direction of closing the sliding members 1 with the fixing shaft 3 being a pivot, whereby a sufficient braking force can be obtained.

Figure 11:
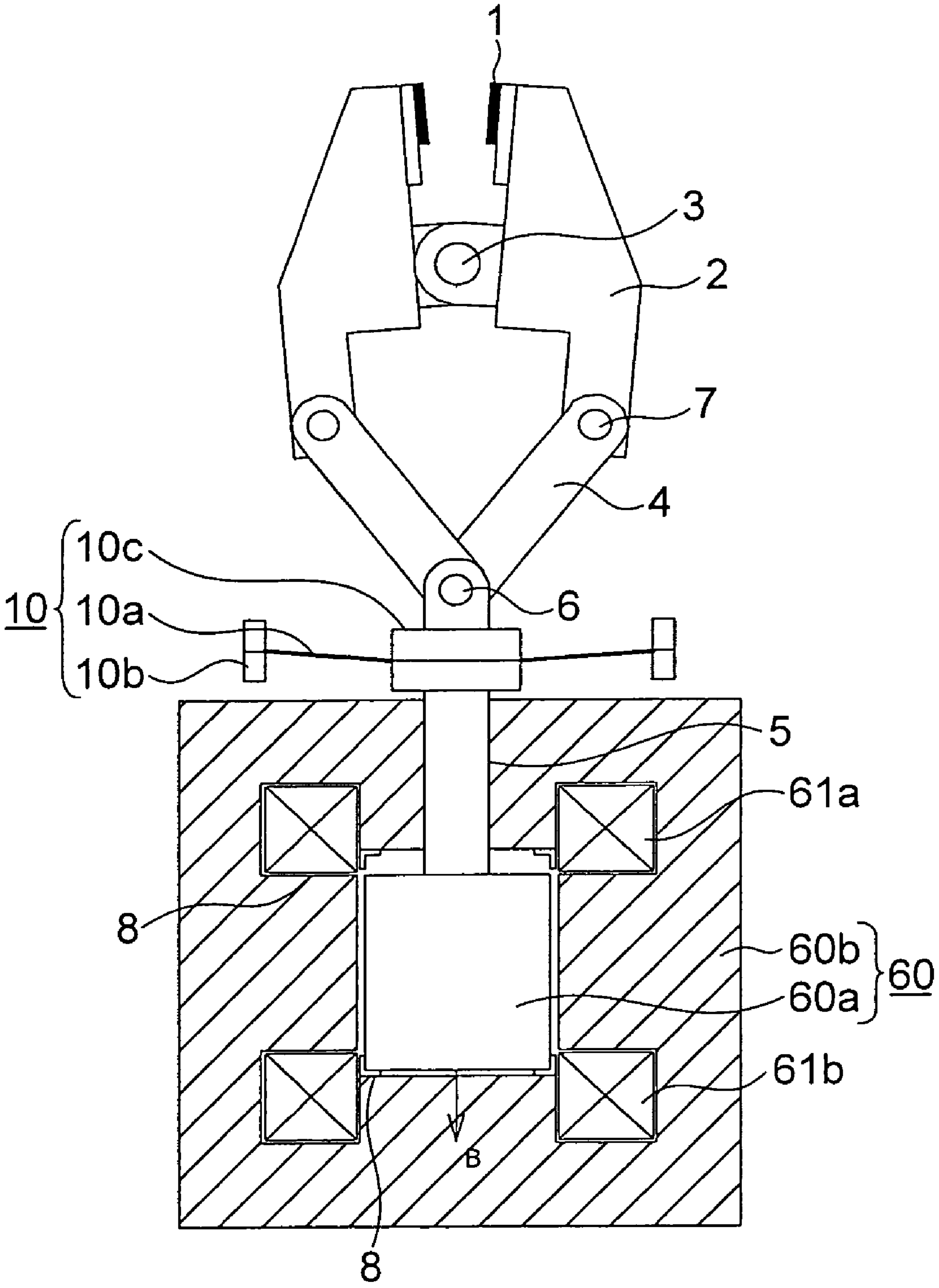
FIG. 11 A view showing a releasing state of the braking device of FIG. 10.

When the releasing coil 61*b* is excited by causing a current to flow therethrough from the braking state of FIG. 10, a magnetic field in a direction represented by an arrow F is generated, and a force of pulling the movable iron core 60*a* back to the direction represented by the arrow B is generated. If the current flowing through the coil is set to be sufficiently strong, the attraction force acting on the movable iron core 60*a* becomes larger than the repulsion force of the belleville spring 10*a*, and the movable iron core 60*a* starts traveling in the direction represented by the arrow B. When the movable plunger travels to a predetermined position (a position where the belleville spring 10*a* becomes flat), the belleville spring is reverted, and the support portion 10*c* travels to the arrow B side beyond the support portion 10*b*. Then, the belleville spring starts generating a negative force (i.e., a force in the direction represented by the arrow B) with respect to the direction represented by the arrow A. Therefore, even if a current is not allowed to flow through the releasing coil 61*b*, the movable plunger 5 travels in the direction represented by the arrow B with the force of the belleville spring, as shown in FIG. 11, the support shafts 7 travel so as to close from the right and left sides due to the function of the links 4, the arms 2 rotate in the direction of opening the sliding members 1 with the fixing shaft 3 being a pivot, the braking force is released, and the releasing state is kept with the spring force of the belleville spring. At this time, it is preferable to provide the stopper 8 for limiting a movable range of the movable iron core 60*b* at upper and lower limits of the movable range so as to prevent the contact between the movable iron core 60*a* and the yoke 60*b*.

The releasing state may be switched to the braking state by causing a current to flow through the braking coil 61*a* to excite the braking coil 61*a*. The operation principle is the same as that of the switching from the braking state to the releasing state except that the direction of a force to be generated becomes opposite. Therefore, the detailed description thereof will be omitted.

With the construction described above, according to the present system, the brake releasing state and braking state are both caused by the reversion of the belleville spring, so energy required for switching the state is that of merely reversing the mechanism, that is, about half of a stroke), whereby small energy suffices, while the conventional brake needs large energy because of a need for attracting an armature against a spring force generating a braking force in shifting the braking state to the releasing state. Furthermore, the repulsion force in a magnetic field caused by an eddy current is used as a drive force for switching between the braking state and the releasing state of the brake, so the brake operation is fast.

EMBODIMENT 5

Figure 12:
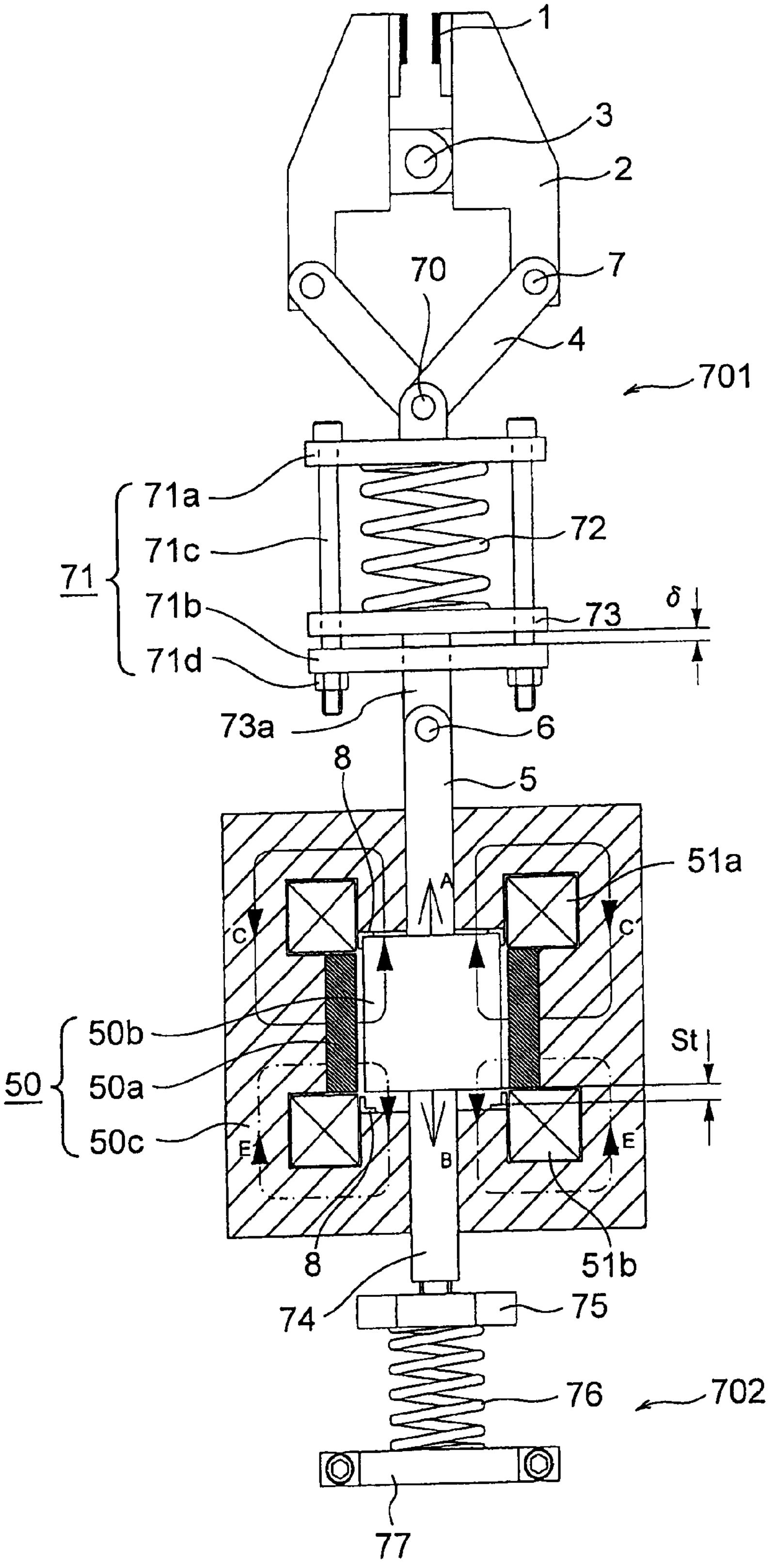
FIG. 12 A view showing a configuration of a braking device for an elevator according to Embodiment 5 of the present invention.

FIG. 12 shows a configuration of a braking device for an elevator according to Embodiment 5 of the present invention. A first spring structure 701 composed of a spring frame 71, a braking spring 72, and a spring bearing 73 is configured between the movable plunger 5 and the link 4. The spring frame 71 is composed of a top plate 71*a* supporting the braking spring 72 that is a compression spring, an adjusting bolt 71*c* for adjusting a compression amount of the spring, a bottom plate 71*b* threaded so as to be screwed on the adjusting bolt 71*c*, and a stopper nut 71*d* screwed on the adjusting bolt 71*c* so as not to change the position of the bottom plate. The spring bearing 73 supporting one end of the braking spring is attached to the spring frame 71 so that the spring bearing 73 moves along the adjusting bolt 71*c*. An end of an axis portion 73*a*, extending downward, of the spring bearing 73, is connected rotatably to the movable plunger 5 via the support shaft 6. Therefore, even if the electromagnetic attracting device 50 is operated and the support shaft 6 moves in the axial direction under a condition that a rail or disk position (i.e., a holding position) is shifted from the center position between the sliding members 1, and a position of the support shaft 70 is shifted toward the right or left, the position can be followed while the distance between the support shaft 6 and the support shaft 70 is changed.

The electromagnetic attracting device 50 is composed of a movable iron core 50*b* to which movable plungers 5 and 74 placed coaxially on opposite sides (braking side and releasing side) in the axial direction are fixed so as to move integrally, a permanent magnet 50*a* provided around the movable iron core 50*b* so as to extend in parallel with the axial direction of the movable plunger, a braking coil 51*a*, a releasing coil 51*b* placed on the braking side and the releasing side (upper and lower portions in the figure) of the permanent magnet 50*a* so as to be opposed to each other, and a yoke 50*c* placed so as to surround the coils 51*a*, 51*b*, the permanent magnet 50*a*, and the movable iron core 50*b*.

The movable plunger 74 protrudes from the movable iron core 50*b* to a side opposite to the braking mechanism, and an adjusting spring bearing 75 is mounted at a tip end of the movable plunger 74. The adjusting spring bearing 75 and the movable plunger 74 are threaded so as to be screwed with each other, so the positional adjustment of the adjusting spring bearing 75 can be performed with respect to the movable plunger 74. A biasing spring 76 that is a compression spring is sandwiched between the adjusting spring bearing 75 and a fixing spring bearing 77, and always generates a force in the direction represented by the arrow A with respect to the movable iron core 50*b*. The adjusting spring bearing 75, the biasing spring 76, and the fixing spring bearing 77 constitute a second spring structure 702.

In the above-mentioned configuration, the fixing shaft 3, the yoke 50*c*, and the fixing spring bearing 77 are fixed to a fixing portion of a brake base, a cage frame, or the like. The other configuration is the same as that in the above-mentioned embodiments. Note that, a braking mechanism is constituted of members denoted by reference numerals 1 to 4, 7, and 70, a first drive mechanism is constituted of members denoted by reference numeral 50, and a second drive mechanism is constituted of members denoted by reference numerals 51*a* and 51*b*.

Figure 13:
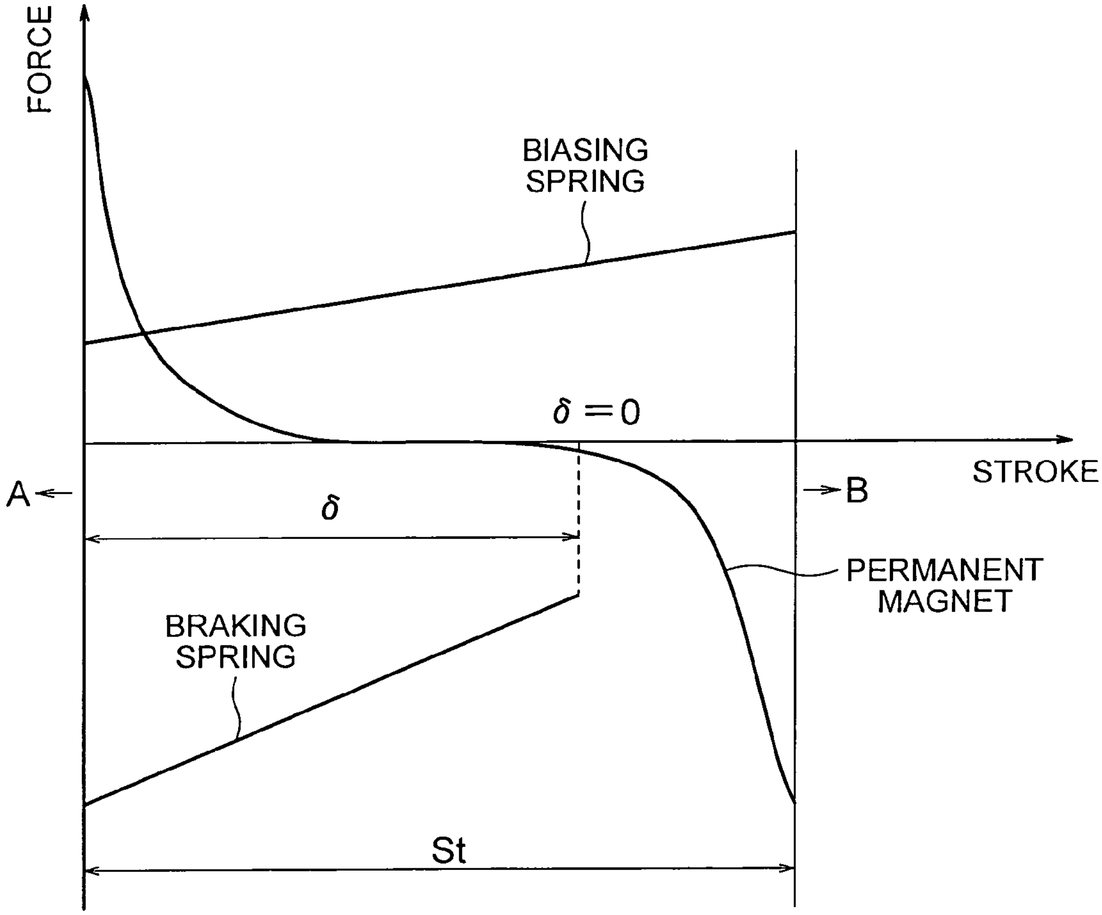
FIG. 13 A diagram schematically showing a relationship between a travel distance of a movable iron core, and a permanent magnet force, a braking spring force, and a biasing spring force.

Next, an operation will be described. FIG. 12 shows a state in which a disk or a rail is held between the sliding members 1, and a braking force is exhibited. It is assumed that a gap formed between the spring bearing 73 and the bottom plate 71*b* is δ. At this time, the braking coil 51*a* and the releasing coil 51*b* both are not excited, and the movable iron core 50*b* is pressed in the direction represented by the arrow A by the magnetic flux in the direction represented by the arrow C generated by the permanent magnet 50*a*. As a result, the spring bearing 73 also receives a force in the direction represented by the arrow A, and imparts a force in the direction of compressing the braking spring 72. At this time, in order for the movable iron core 50*b* to be held by the yoke 50*c*, and to obtain a sufficient braking force, the combined force of the permanent magnet 50*a* and the biasing spring 76 must be set to be larger than the force generated by the braking spring 72, as shown in FIG. 13. The sliding member 1 holds a rail or a disk, and can not move in the direction of narrowing the gap further. Therefore, the position of the support shaft 70 is not changed, and the force by which the braking spring 72 is compressed is transmitted to the sliding members 1 via the top plate 71*a*, the links 4, and the arms 2, whereby a sufficient braking force can be obtained.

When the releasing coil 51*b* is excited by causing a current to flow therethrough from the state of FIG. 12, a magnetic flux is formed in the direction represented by the arrow E, and a force of pulling the movable iron core 50*b* back to the direction represented by the arrow B is generated. If the current flowing through the coil is set to be sufficiently strong, the force given to the movable iron core 50*b* by the magnetic field induced to the coil becomes larger than the combined force generated by the permanent magnet 50*a*, the braking spring 72, and the biasing spring 76, and the movable iron core 50*b* starts traveling in the direction represented by the arrow B. To be more specific, the combined force generated by the releasing coil 51*b* and the braking spring 72 becomes larger than the combined force generated by the permanent magnet 50*a* and the biasing spring 76, whereby the movable iron core 50*b* travels in the direction represented by the arrow B.

Until the movable plunger reaches a predetermined position (position at which the gap δ of FIG. 13 is 0) in the middle of a stroke, the combined force generated by the permanent magnet 50*a*, the braking spring 72, and the biasing spring 76 acts in the direction represented by the arrow A. However, when the movable plunger travels beyond the predetermined position, the spring bearing 73 comes into contact with the bottom plate 71*b* and moves integrally with the spring frame 71, and the sliding members 1 leave the rail or the disk due to the functions of the links 4 and the arms 2, whereby the braking force is released. At this time, the force given to the movable iron core 50*b* by the permanent magnet 50*a* is reversed in the direction represented by the arrow B. Therefore, even if a current is not caused to flow through the releasing coil 51*b*, the movable iron core 51*b* is pressed to the arrow B side, and the releasing state is held by the magnetic force of the permanent magnet 50*a*. At this time, it is preferable to provide the stopper 8 limiting the movable range of the movable iron core 50*b* at upper and lower limits of the movable range so as to prevent the contact between the movable iron core 50*b* and the yoke 50*c*.

The releasing state may be switched to the braking state by causing a current to flow through the braking coil 51*a* to excite the braking coil 51*a*. At this time, the force of the braking spring 72, which presses the movable iron core 50*b* in the direction represented by the arrow B, does not function until the position of δ=0. Therefore, the first motion of the movable iron core 50*b* becomes fast, which can speed up the braking operation. The operation principle is the same as that of the switching from the braking state to the releasing state except that the force to be generated becomes opposite to return to the braking state. Therefore, the detailed description thereof will be omitted.

With the construction described above, according to the present system, the combined force generated by the braking spring 72, the biasing spring 76, and the permanent magnet 50*a* given to the movable iron core 50*b* is reversed in the middle of a stroke, so energy required for switching the state is that of merely reversing the mechanism (i.e., the one until the middle of the stroke), whereby small energy suffices, while the conventional brake needs large energy because of a need for attracting an armature against a spring force generating a braking force in shifting the braking state to the releasing state.

Furthermore, the braking spring 72 is configured so as to start acting from the middle of the stroke from the releasing state to the braking state. Therefore, the force required to be generated by the braking coil 51*a* for initially moving the movable iron core 50*b* is that of merely the difference between the force generated by the permanent magnet 50*a* and the force of the biasing spring 76, whereby the speed of the operation during braking of a brake can be increased.

The invention claimed is:

1. A braking device for an elevator comprising:

a movable plunger;

a braking mechanism which is connected to one end of said movable plunger and is configured to move through a movable range in an axial direction of the movable plunger from a braking state to a releasing state and move through the movable range in a reverse axial direction of the movable plunger from the releasing state to the braking state;

a first drive mechanism using a mechanical or magnetic force to press said movable plunger in the axial direction and hold said movable plunger in the releasing state when the movable plunger is in a first portion of the movable range, and to press said movable plunger in the reverse axial direction and hold said movable plunger in the braking state when the movable plunger is in a second portion of the movable range; and a second drive mechanism using an electromagnetic force to drive said movable plunger from the first portion of the movable range to the second portion of the movable range for switching to the braking state and drive said movable plunger from the second portion of the movable range to the first portion of the movable range for switching to the releasing state.

2. The braking device for the elevator according to claim 1, wherein said first drive mechanism comprises a belleville spring whose center portion is fixed to said movable plunger.

3. The braking device for the elevator according to claim 1, wherein said first drive mechanism comprises a magnetic circuit including a movable iron core and a permanent magnet, for pressing and holding the movable iron core, fixed to said movable plunger, in the braking state or the releasing state.

4. The braking device for the elevator according to claim 1, wherein said second drive mechanism comprises a repulsion plate fixed to said movable plunger, and a braking coil and a releasing coil which are provided on a braking side and a releasing side, respectively, of the repulsion plate in the axial direction of said movable plunger, and generate an eddy current for obtaining a repulsion force between the repulsion plate and the braking coil and between the repulsion plate and the releasing coil.

5. The braking device for the elevator according to claim 2, wherein said second drive mechanism comprises a repulsion plate fixed to said movable plunger, and a braking coil and a releasing coil which are provided on a braking side and a releasing side, respectively, of the repulsion plate in the axial direction of said movable plunger, and generate an eddy current for obtaining a repulsion force between the repulsion plate and the braking coil and between the repulsion plate and the releasing coil.

6. The braking device for the elevator according to claim 3, wherein said second drive mechanism comprises a repulsion plate fixed to said movable plunger, and a braking coil and a releasing coil which are provided on a braking side and a releasing side, respectively, of the repulsion plate in the axial direction of said movable plunger, and generate an eddy current for obtaining a repulsion force between the repulsion plate and the braking coil and between the repulsion plate and the releasing coil.

7. The braking device for the elevator according to claim 3, wherein said second drive mechanism comprises a braking coil and a releasing coil which are provided on a braking side and a releasing side of the movable iron core in the axial direction of said movable plunger of the magnetic circuit, and respectively impart an attraction force to the movable iron core.

8. The braking device for the elevator according to claim 1, wherein said second drive mechanism comprises a magnetic circuit including a movable iron core, a braking coil, and a releasing coil, imparting an attraction force from the braking coil and the releasing coil respectively provided on a braking side and a releasing side of the movable iron core in the axial direction of the movable plunger to the movable iron core fixed to the movable plunger.

9. The braking device for the elevator according to claim 2, wherein said second drive mechanism comprises a magnetic circuit including a movable iron core, a braking coil, and a releasing coil, imparting an attraction force from the braking coil and the releasing coil respectively provided on a braking side and a releasing side of the movable iron core in the axial direction of the movable plunger to the movable iron core fixed to the movable plunger.

10. The braking device for the elevator according to claim 1, further comprising two spring structures for imparting forces in opposite directions from positions opposed to each other on a stroke of said movable plunger.

11. The braking device for the elevator according to claim 10, wherein said two spring structures further comprise a first spring structure imparting a force pressing said movable plunger to a releasing side and including a spring whose extension range is limited and does not impart a force to said movable plunger while said movable plunger is in a predetermined range from the releasing side.

12. The braking device for the elevator according to claim 11, wherein said first spring structure is rotatably connected between said braking mechanism and said first drive mechanism and said second drive mechanism via a support shaft perpendicular to the axial direction of said movable plunger.

13. The braking device according to claim 1, wherein the second drive mechanism is configured to drive said movable plunger only through a distance shorter than the movable range when switching from the braking state to the releasing state and when switching from the releasing state to the braking state.

14. An elevator apparatus comprising:

a movable plunger;

a rail or a disk;

a braking mechanism which is connected to said movable plunger and is configured to move through a movable range in an axial direction of the movable plunger from a braking state to a releasing state of the rail or disk and move through the movable range in a reverse axial direction of the movable plunger from the releasing state to the braking state of the rail or disk;

a first drive device using a mechanical or magnetic force to press said movable plunger in the axial direction and hold said movable plunger in the releasing state when the movable plunger is in a first portion of the movable range, and to press said movable plunger in the reverse axial direction and hold said movable plunger in the braking state when the movable plunger is in a second portion of the movable range;

a second drive device using an electromagnetic force to drive said movable plunger from the first portion of the movable range to the second portion of the movable range for switching to the braking state and drive said movable plunger from the second portion of the movable range to the first portion of the movable range for switching to the releasing state;

an emergency battery for moving an elevator to a nearest floor in an event of a power failure; and a power supply which is supplied with electric power from said emergency battery to generate the electromagnetic force.

15. The apparatus according to claim 14, wherein the second drive device is configured to drive said movable plunger only through a distance shorter than the movable range when switching from the braking state to the releasing state and when switching from the releasing state to the braking state.

16. A braking device for an elevator comprising:

a movable plunger;

a braking mechanism which is connected to one end of said movable plunger and is switched between a braking state and a releasing state due to a movement in an axial direction of said movable plunger;

a first drive mechanism using a mechanical or magnetic force, for reversing said movable plunger in a middle of a movable range in the axial direction for switching between the braking state and the releasing state to press and hold said movable plunger to a braking side or a releasing side, said first drive mechanism comprising a magnetic circuit including a movable iron core and a permanent magnet, for pressing and holding the movable iron core, fixed to said movable plunger, to the braking side or the releasing side; and a second drive mechanism using an electromagnetic force, for driving said movable plunger to a reversion position in the middle of the movable range from the braking side or the releasing side against a pressing force of said first drive mechanism in order to switch between the braking state and the release state.

* * * * *